United States Patent
Oh et al.

(10) Patent No.: US 9,977,475 B2
(45) Date of Patent: May 22, 2018

(54) OVER VOLTAGE PROTECTION FOR A COMMUNICATION LINE OF A BUS

(71) Applicant: Apple Inc., Cupertino, CA (US)

(72) Inventors: InHwan Oh, Cupertino, CA (US); Marco Soldano, San Jose, CA (US); Nicholas A. Sims, Cupertino, CA (US); Manisha P. Pandya, Saratoga, CA (US); Bogdan T. Bucheru, San Jose, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 14/831,682

(22) Filed: Aug. 20, 2015

(65) Prior Publication Data

US 2016/0091940 A1     Mar. 31, 2016

Related U.S. Application Data

(60) Provisional application No. 62/057,889, filed on Sep. 30, 2014.

(51) Int. Cl.
*H02H 3/20* (2006.01)
*H02H 9/04* (2006.01)
*G06F 1/26* (2006.01)

(52) U.S. Cl.
CPC ...................... *G06F 1/26* (2013.01)

(58) Field of Classification Search
CPC ............ H02H 3/20; H02H 9/04; H02H 9/041
USPC ................................................ 361/93.1, 91.5
See application file for complete search history.

(56) References Cited

U.S. PATENT DOCUMENTS

| | | | |
|---|---|---|---|
| 7,701,168 B2 * | 4/2010 | Thijssen | H02J 7/0052 320/111 |
| 7,835,124 B2 | 11/2010 | Siddhartha et al. | |
| 8,018,699 B2 | 9/2011 | Smith et al. | |
| 2010/0073837 A1 * | 3/2010 | Predtetchenski | G06F 13/4072 361/91.5 |
| 2010/0165528 A1 * | 7/2010 | Chan | H04L 12/40045 361/86 |
| 2013/0278205 A1 * | 10/2013 | Mullins | G06F 21/44 320/107 |
| 2013/0286522 A1 * | 10/2013 | Mullins | H04M 3/08 361/58 |

* cited by examiner

*Primary Examiner* — Dharti Patel
(74) *Attorney, Agent, or Firm* — Blank Rome LLP

(57) ABSTRACT

An electronic device has an I/O port, a bus connector and a transistor that is connected between the I/O port and a communications contact of the bus connector. A control circuit is connected to the transistor to maintain a gate voltage of the transistor independent of power supply voltage on a power supply contact of the connector. Other embodiments are also described and claimed.

22 Claims, 2 Drawing Sheets

OVER VOLTAGE PROTECTION FOR A COMMUNICATION LINE OF A BUS

This non-provisional application claims benefit of the earlier filing date of U.S. Provisional Application Ser. No. 62/057,889 filed Sep. 30, 2014.

An embodiment of the invention relates to techniques for protecting sensitive electronic circuitry that is connected to a communication or data line of a computer peripheral bus, against an over voltage condition that could otherwise damage the sensitive electronic circuitry. Other embodiments are also described.

BACKGROUND

Computers (also referred to as "computing devices") use a communications or data bus that has two or more lines to transfer electrical communication signals to another external device. A currently popular computer peripheral bus is the well-known universal serial bus (USB), which is used in a wide range of computing devices. One of the desirable features of a USB connector design is that in addition to the communication contacts, there are one or more power supply contacts on which power can be provided from one device to the other connected device. This allows the bus connector to be used not just for communications but also for charging the battery of a portable device from, for example, an external power source such as an AC wall power adapter, an automotive power adapter, or another computing device such as a desktop computer.

If the specified power supply voltage on the power supply contact of a bus connector is much higher than the allowed signal swing on the communications lines, then this presents a problem during an accidental short circuit situation in which a low impedance electrical path is accidentally formed between the communication contact and the power supply contact. That is because an input/output (I/O) port of a sensitive electronic circuit, such as that of a digital microelectronic integrated circuit, e.g. a microcontroller or a microprocessor, that is connected to the communications contact, could be damaged by the over voltage condition that is created by the external short circuit. One approach to alleviating the over voltage stress that may be inflicted upon the sensitive electronic circuit is to add a clamping circuit that is connected between the communications contact and the power supply of the microelectronic integrated circuit. The clamping circuit automatically limits the excursion of the voltage on the communications contact to only one diode drop above the power supply voltage of the sensitive electronic circuit. Such clamping circuits, however, form a so-called parallel connection to the communications contact and as a result increase the parallel capacitance on that contact, thereby degrading the maximum speed of the communications through that contact.

A protection circuit has been suggested that helps prevent the above-described over voltage condition on the communications contact, while not significantly degrading communications speed. In that technique, a variable resistance device is connected between the sensitive integrated circuit port and the connector contact. As an example, a metal oxide semiconductor field effect transistor (MOSFET) may be used, that is controlled by an over voltage detector such that during an over voltage event, the detector turns off the transistor (open circuit state). The gate terminal of the transistor is used as a threshold detector, by connecting the gate to the power supply contact $V_{bus}$ of the connector. If the voltage on the communication line does not exceed one transistor threshold drop below the power supply contact voltage $V_{bus}$, then the transistor stays on (short circuit state), which allows the communications signal to be transmitted through. If, however, the voltage on the communications contact reaches the power supply contact voltage $V_{bus}$, then the transistor begins to switch into its open circuit state, presenting a high series resistance between the communications contact and the integrated circuit port, thereby preventing the voltage on the integrated circuit port from rising above $V_{bus}$. This should help protect the integrated circuit port from seeing voltages higher than $V_{bus}$ that might otherwise damage the port.

SUMMARY

An embodiment of the invention is a circuit that helps protect an I/O port of an integrated circuit from an over voltage condition that may arise on a communications contact of a bus connector, where the connector also has a power supply contact on which there could be a power supply voltage that is greater than the maximum allowable voltage to which the I/O port can be subjected. A transistor (such as a MOSFET) is connected between the I/O port and the communications contact, such that the I/O port transmits or receives a communications signal through drain and source terminals of the transistor. A control circuit maintains a gate voltage of the transistor independent of the voltage on the power supply contact. In this fashion, the I/O port remains protected against a short circuit between the power supply contact and the communications contact, even if the bus connector were connected to an external device that produces a power supply voltage that is greater than the maximum permissible voltage of the I/O port. For example, if the maximum permissible voltage for the I/O port is +5 volts DC, but the bus connector could be connected to a future generation external device that produces 20 volts DC on the power supply contact, then because the control circuit maintains the gate voltage of the transistor independent of the voltage on the power supply contact, the I/O port will not be exposed to any voltage greater than the set gate voltage of the transistor.

In one embodiment, the gate voltage of the transistor remains fixed, regardless of the bus connector being connected to future generations of external AC power adapters or other power sources that produce significantly higher voltages on the power supply contact. This allows the electronic device as a whole to be upwards compatible, through its bus connector, with future generations of external power sources. As an example, the electronic device may be a portable device such as a consumer electronics laptop computer, tablet computer or smartphone that is battery-powered and contains a battery charger circuit that can draw power from the power supply contact of the bus connector to charge the battery.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in order to reduce the total number of figures, a given figure may be used to illustrate the features of more than one embodiment of the invention, and not all elements in the figure may be required for a given embodiment.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
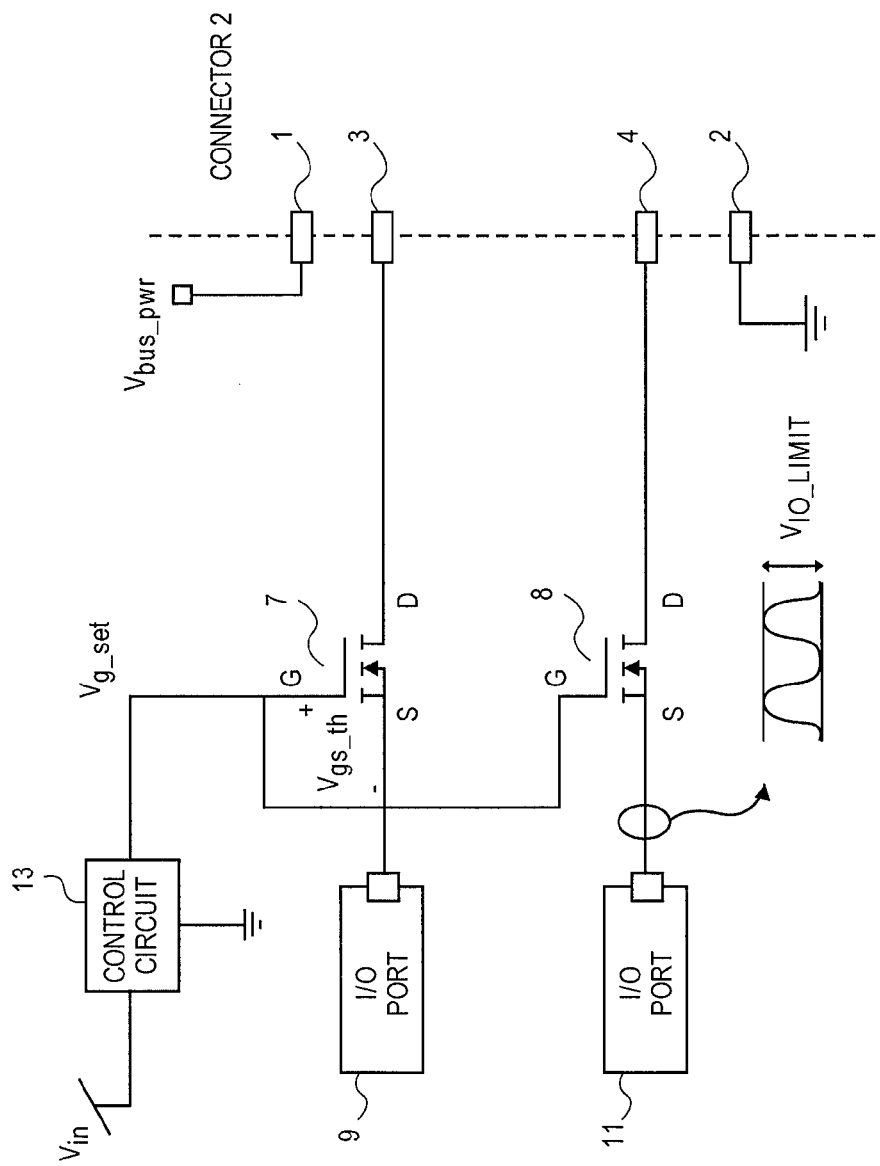
FIG. 1 is circuit schematic of a part of an electronic device, depicting an over voltage protection scheme.

FIG. 1 is a circuit schematic of a part of an electronic device, depicting an over voltage protection scheme. The electronic device has a connector 5 that has several contacts, including a power supply contact 1, first and second data or communications contacts 3, 4 and a power return contact 2. The power supply voltage on contact 1 is indicated to be $V_{bus\_pwr}$, while the power supply return contact 2 is in this case connected to circuit ground or zero volts. In another embodiment, the power supply and return contacts 1, 2 could receive positive and negative power supply voltages (from a positive and negative dual output power supply that may be plugged in to the connector 5—not shown). In general, the connector 5 may be exposed outside the housing of the device such that there is a risk of a short circuit or other low impedance path being created between one of the communications contacts 3, 4 and one of the power supply contacts 1, 2 during normal end-user use of the device. Examples of such devices include typical consumer electronics devices such as desktop computers, laptop computers, tablet computers and smartphones. In particular, the connector 5 may be in accordance with an industry standard or other popular computer peripheral bus connector design, such as Universal Serial Bus (USB) Specification.

The communications signals on the contacts 3, 4 are either transmitted or received by their respective I/O ports 9, 11. In one embodiment, the I/O port 9 is a transmit-only or output port, while the I/O port 11 is a receive-only or input port. However, in other embodiments, each I/O port may be bidirectional, serving as both an input port and an output port, such that the communications signal on the communication line (including the connector contact associated with that port) may be a bidirectional communications signal. Thus, the term "I/O" is used generically here to refer to either input only, output only or bidirectional signaling capability.

Although not shown in FIG. 1, the I/O ports 9, 11 may be part of a more complex electronic circuit, including for example a digital microelectronic integrated circuit such as a microcontroller or a microprocessor. An example is a communications circuit 161'see FIG. 2—such as a USB transceiver circuit. Although not shown, the I/O port 9, 11 may need a power supply voltage itself that is at a different level than $V_{bus\_pwr}$, for example smaller than $V_{bus\_pwr}$ and that may be produced by a voltage regulator circuit (not shown).

Still referring to FIG. 1, a transistor 7 is connected between the I/O port 9 and the communications contact 3, such that the I/O port 9 can transmit or receive a communications signal through drain and source terminals of the transistor 7. As mentioned above, this may be an input communications signal, an output communications signal, or a bidirectional communications signal that may be expressed as the voltage on contact 3. In this particular example, there is another communication line that includes the contact 4 of the connector 5, and a similar transistor 8 is connected between the contact 4 and its associated I/O port 11 as shown. The transistors 7, 8 are in this case depicted as insulated gate field effect transistors (FETs) which are typically understood to have a drain terminal, a source terminal and a gate terminal. In this instance, the FETs 7, 8 are N-channel enhancement mode devices although in other cases, particularly where there are different power supply voltages available, including for example a dual output supply arrangement, other types of FETs could be used such as, for example, P-channel devices, depletion mode devices and junction field effect transistors (JFETs).

A control circuit 13 is connected to the transistor 7 and to the transistor 8 to maintain the gate voltage of each transistor independent of $V_{bus_{pwr}}$. In this manner, while future generations of external power sources that are plugged into the connector 5 might produce high voltages on the contact 1, such that $V_{bus\_pwr}$ may be higher than the voltage that is set for the gate, $V_{g_{set}}$, the I/O ports 9, 11 remain protected in those instances, due to $V_{g_{set}}$ being kept independent of the changing $V_{bus\_pwr}$. This may be achieved by designing the control circuit 13 to produce $V_{g_{set}}$ based on some input voltage $V_{in}$. Vin itself could be produced for example by a voltage regulator (not shown), whose input supply voltage may be the same or different than $V_{bus\_pwr}$. For example, in the embodiment of FIG. 2, $V_{g\_set}$ is produced by a voltage regulator 17 whose input supply node is connected to a battery 18. More generally, the control circuit 13 may include any suitable voltage regulator, which may be a linear regulator or a step-up regulator or a step-down regulator, that maintains the gate voltage $V_{g\_set}$ at a regulated level despite changes in its power supply input $V_{in}$ and changes in $V_{bus\_pwr}$.

In one embodiment, the control circuit 13 maintains the gate voltage $V_{g\_set}$ at a level that is a) different than $V_{bus\_pwr}$ and b) constant despite changes to $V_{bus\_pwr}$. In another embodiment, the control circuit 13 continuously maintains $V_{g\_set}$ at a given level while the electronic device as a whole remains powered on and awake, but also while the electronic device remains asleep. Thus, in a case where the electronic device is a portable device that can be put to sleep so as to save battery energy while not in use, the control circuit 13 may in that case remain operating to continuously maintain $V_{g_{set}}$ at a given level in order to provide continued protection to the I/O ports 9, 11 even while the portable device is asleep.

In another embodiment, the control circuit 13 maintains the gate voltage $V_{g\_set}$ between a) $V_{i/o\_limit}+V_{th}$ and b) $V_{i/o\_max}+V_{th}$ where $V_{i/o\_limit}$ is a voltage swing limit for the I/O port 9, 11, $V_{th}$ is a gate to source threshold voltage for the transistor 7, 8, and $V_{i/o\_max}$ is a maximum voltage for the I/O port 9, 11.

As seen in FIG. 1, $V_{i/o\_limit}$ is the "normal" voltage swing limit for the I/O port 9, 11. Note that $V_{i/o\_limit}$ may be less than $V_{i/o\_max}$, where $V_{i/o\_max}$ may be a maximum voltage that is specified by a manufacturer of the I/O port 9, 11.

For example, consider the case where $V_{g\_set}=V_{i/o\_limit}+V_{th}$. In such a case, so long as the voltage on the communications contact 3, 4 does not exceed $V_{i/o\_limit}$, $V_{gs}$ remains above its threshold drop and so the transistor 7, 8 remains fully turned on (short circuit state). If the voltage on the communications contact 3, 4 begins to exceed $V_{i/o\_limit}$ then $V_{gs}$ starts to become smaller than its threshold drop $V_{th}$, and therefore begins to turn off. When the voltage on the communications contact exceeds $V_{i/o\_limit}$ by at least the threshold drop, then the transistor is fully turned off (open circuit state), thereby essentially isolating the I/O port 9, 11 from the voltage on the communications contact.

In many instances, the control circuit 13 maintains the gate voltage $V_{g\_set}$ at less than $V_{bus\_pwr}$.

Figure 2:
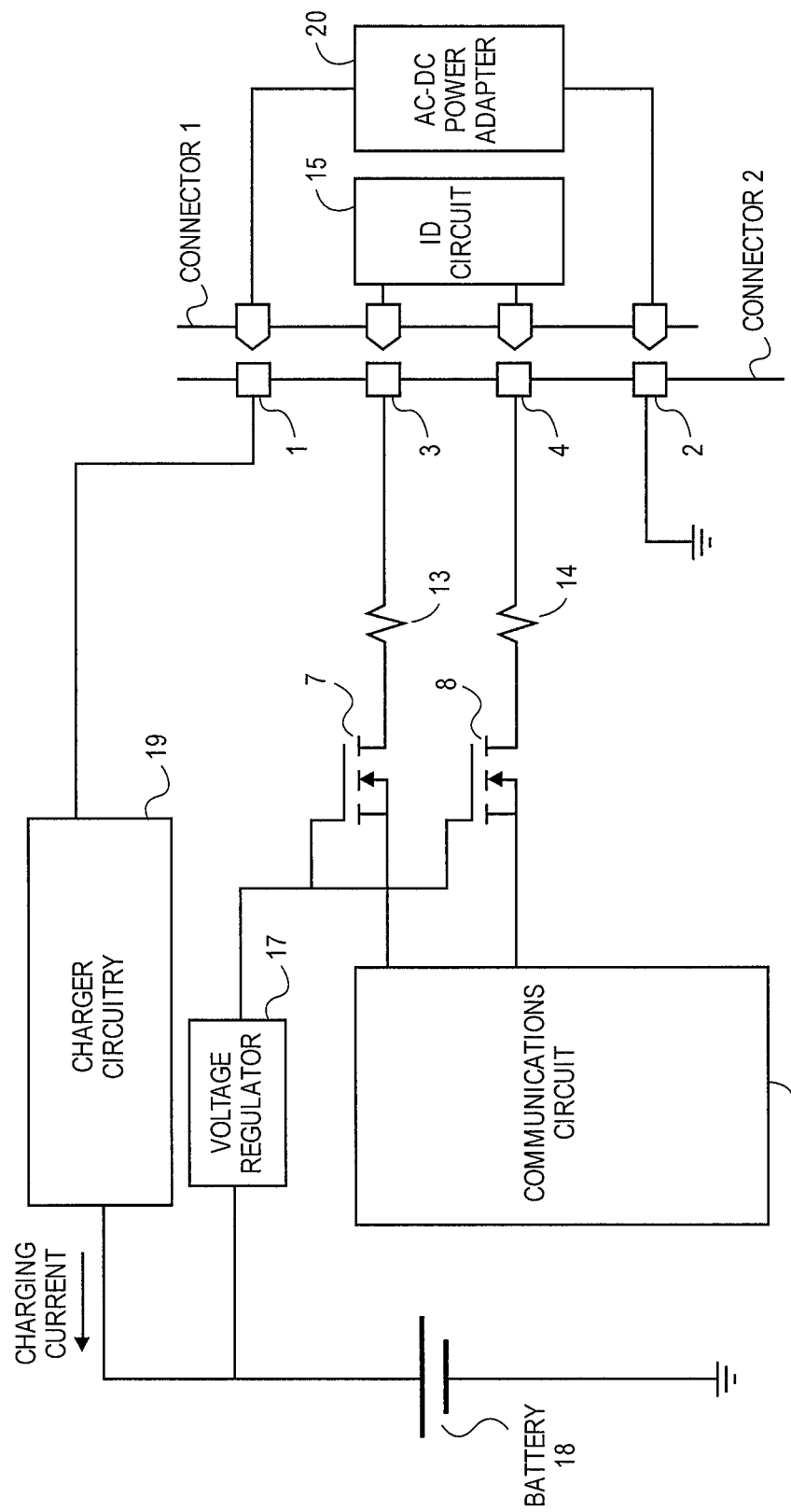
FIG. 2 is a circuit schematic of another embodiment of the over voltage protection scheme as used in a portable electronic device.

Turning now to FIG. 2, this is a circuit schematic of part of a portable electronic device in which an I/O port protection scheme has been implemented. In this case, the I/O ports are not shown but are part of a communications circuit 16, which may be a digital microelectronic integrated circuit such as a microprocessor or a microcontroller that may be part of a power management unit or that may be a separate or dedicated USB transceiver circuit. The device depicted in FIG. 2 is a portable device and has a battery 18 that is rechargeable, and whose charging current is controlled by charging circuitry 19 which may also be within the housing of the portable device (e.g., within the housing of a tablet or smartphone device). The charger circuitry 19 has an input port connected to the power supply contact 1 of the connector 5, and draws power from that contact to charge the battery 18 through its output port. Charging occurs when the device is plugged into an external power source through another connector 10, where the external power source may include an AC-DC power adapter, an automotive power adapter or other suitable external power source.

In the particular example of FIG. 2, the communications contacts 3, 4 are connected to an external identification circuit 15 through respective contacts of the connector 10, where the identification circuit 15 serves to identify the capabilities of the external power source, in this case an ac-dc power adapter, 20 particularly for example with respect to the available $V_{bus\_pwr}$ that the adapter will provide and the available current or power delivery that may be available for the battery charger circuitry 19 (through the contacts 1, 2). This information may be obtained by the communications circuit 16 through the communications contacts 3, 4, e.g. according to a bus discovery and enumeration protocol followed by any suitable transfer of information concerning the capabilities of devices that are connected to each other in this manner.

FIG. 2 also is used to illustrate another aspect of the invention, which may be combined with that of FIG. 1 if desired, namely the addition of series resistors 13, 14 which serve to limit current in the communication lines, between the communications contacts 3, 4 and the I/O ports within the communications circuit 16. These may serve to limit current while the transistors 7, 8 are turned on or in their short circuit state (that is, during normal operation of the protection scheme here).

The transistors 7, 8 in the example of FIG. 2 have their gate terminals connected to a voltage regulator 17 which maintains the gate voltages at a $V_{g\_set}$ that may be fixed for example at the time of manufacture of the protection circuit, or at the time of assembly of the portable electronic device as a whole. The voltage regulator 17 maintains $V_{g\_set}$ independent of the voltage on the power supply contact 1, in accordance with any of the approaches described above. In this case, the voltage regulator 17 has an input supply port that is connected to the battery 18. Note that in some cases, the voltage regulator 17 may be a boost regulator that raises the input voltage of the battery 18 to a higher $V_{g\_set}$ level for the transistors 7, 8. Although not shown, the power supply of the communications circuit 16 may be a separate voltage regulator that is sourcing its power also from the battery 18. The variations described above in connection with FIG. 1 also apply to FIG. 2, including for example the particular ways and voltage range in which the voltage regulator 17 will maintain $V_{g\_set}$.

An embodiment of the invention is a method for operating an electronic device, such as a portable electronic device as described above, as follows. The electronic device has a bus connector in which there is a communications contact and a power supply contact. Data is transmitted or received (or both) through a communications line that connects an I/O port of the device to the communications contact of the bus connector. The communications line is interrupted in a circuit sense, by a source terminal and a drain terminal of a transistor, such that signaling current in the communications line passes through the source and drain terminals of the transistor (so long as a gate voltage of the transistor is maintained, to yield $V_{gs}>V_{th}$ for the transistor). The gate voltage of the transistor is maintained independently of a power supply voltage that appears on the power supply contact of the connector. The power supply voltage may be provided by an external power source that is plugged into the connector, e.g. an external ac to dc power adapter, and that provides a regulated dc power supply voltage on the power supply contact. In this manner, the transistor may act to protect the I/O port against an over voltage condition in which the communications contact of the bus connector is accidentally shorted to the power supply contact. This benefit is kept even with future generations of external power sources that deliver a higher power supply voltage on the power supply contact, i.e. higher than a maximum operating voltage of the I/O port (on the communications line). In a further embodiment, the gate voltage is maintained at a level that is not only different than the voltage of the power supply contact, but also constant (despite changes to the voltage of the power supply contact). In other words, if another external power source is connected that has a higher power supply voltage (on the power supply contact) than an initial external power source, the gate voltage level is maintained constant despite such increase in the power supply contact voltage.

In another embodiment, the gate voltage is maintained within the following range, that is between a) $V_{i/o\_limit}+V_{th}$ and b) $V_{i/o\_max}+V_{th}$ where $V_{i/o\_limit}$ is a voltage swing limit for the I/O port, $V_{th}$ is a gate to source threshold voltage for the transistor, and $V_{i/o\_max}$ is a maximum voltage for the I/O port.

The gate voltage may be maintained at this level not just while the electronic device remains powered on and awake, but also while the electronic device remains asleep.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while FIG. 1 shows the connector 5 having at least four contacts, there could be more than four contacts (including for example more than two communications contacts 3, 4), or it could have only three contacts, namely the power supply contact 1, power return contact 2 and a single communications contact 3. The description is thus to be regarded as illustrative instead of limiting.

What is claimed is:

1. An electronic device comprising:
   an I/O port;
   a bus connector having a power supply contact and a communications contact;
   a transistor connected between the I/O port and the communications contact such that the I/O port can transmit or receive a communications signal through drain and source terminals of the transistor; and
   a control circuit that is connected to the transistor to maintain gate voltage of the transistor independent of a power supply voltage on the power supply contact.

2. The electronic device of claim 1 wherein the control circuit maintains the gate voltage of the transistor at a level that is a) different than voltage of the power supply contact, and b) constant despite changes to the voltage of the power supply contact.

3. The electronic device of claim 2 wherein the control circuit continuously maintains the gate voltage at said level while the electronic device remains powered on and awake and while the electronic device remains asleep.

4. The electronic device of claim 2 wherein the control circuit comprises a voltage regulator that maintains the gate voltage at a regulated level.

5. The electronic device of claim 2 wherein the control circuit continuously maintains the gate voltage at said level while the electronic device remains powered on and awake and while the electronic device remains asleep and wherein the control circuit comprises a voltage regulator that maintains the gate voltage at a regulated level.

6. The electronic device of claim 5 wherein the control circuit maintains the gate voltage between a) Vi/o_limit+Vth and b) Vi/o_max+Vth where:
   Vi/o_limit is a voltage swing limit for the I/O port,
   Vth is a gate to source threshold voltage for the transistor, and
   Vi/o_max is a maximum voltage for the I/O port.

7. The electronic device of claim 2 wherein the control circuit comprises a voltage regulator that maintains the gate voltage at a regulated level and wherein the control circuit maintains the gate voltage between a) Vi/o_limit+Vth and b) Vi/o_max+Vth where:
   Vi/o_limit is a voltage swing limit for the I/O port,
   Vth is a gate to source threshold voltage for the transistor, and
   Vi/o_max is a maximum voltage for the I/O port.

8. The electronic device of claim 2 wherein the control circuit continuously maintains the gate voltage at said level while the electronic device remains powered on and awake and while the electronic device remains asleep and wherein the control circuit maintains the gate voltage between a) Vi/o_limit+Vth and b) Vi/o_max+Vth where:
   Vi/o_limit is a voltage swing limit for the I/O port,
   Vth is a gate to source threshold voltage for the transistor, and
   Vi/o_max is a maximum voltage for the I/O port.

9. The electronic device of claim 2 wherein the control circuit maintains the gate voltage between a) Vi/o_limit+Vth and b) Vi/o_max+Vth where:
   Vi/o_limit is a voltage swing limit for the I/O port,
   Vth is a gate to source threshold voltage for the transistor, and
   Vi/o_max is a maximum voltage for the I/O port.

10. The electronic device of claim 1 wherein the control circuit maintains the gate voltage between a) Vi/o_limit+Vth and b) Vi/o_max+Vth where:
    Vi/o_limit is a voltage swing limit for the I/O port,
    Vth is a gate to source threshold voltage for the transistor, and
    Vi/o_max is a maximum voltage for the I/O port.

11. The electronic device of claim 1 wherein the control circuit maintains the gate voltage at less than the power supply voltage on the power supply contact.

12. A portable electronic device comprising:
    a battery;
    an I/O port;
    a bus connector having a power supply contact and a communications contact;
    a transistor connected between the I/O port and the communications contact such that the I/O port has a current path to the communications contact through drain and source terminals of the transistor;
    a voltage regulator circuit having an input connected to the battery and an output connected to a gate of the transistor; and
    a battery charger circuit connected to the battery and to the power supply contact, wherein the battery charger circuit draws power from the power supply contact to charge the battery.

13. The portable electronic device of claim 12 wherein the regulator circuit maintains the gate of the transistor at a gate voltage that is a) different than voltage of the power supply contact, and b) constant despite changes to the voltage of the power supply contact.

14. The portable electronic device of claim 13 wherein the regulator circuit continuously maintains the gate voltage while the electronic device remains powered on and awake and while the electronic device remains asleep.

15. The portable electronic device of claim 14 wherein the output of the regulator circuit is between a) Vi/o_limit+Vth and b) Vi/o_max+Vth where:
    Vi/o_limit is a voltage swing limit for the I/O port,
    Vth is a gate to source threshold voltage for the transistor, and
    Vi/o_max is a maximum voltage for the I/O port.

16. The portable electronic device of claim 13 wherein the output of the regulator circuit is between a) Vi/o_limit+Vth and b) V i/o_max+Vth where:
    Vi/o_limit is a voltage swing limit for the I/O port,
    Vth is a gate to source threshold voltage for the transistor, and
    Vi/o_max is a maximum voltage for the I/O port.

17. The portable electronic device of claim 12 wherein the output of the regulator circuit is between a) Vi/o_limit+Vth and b) Vi/o_max+Vth where:
    Vi/o_limit is a voltage swing limit for the I/O port,
    Vth is a gate to source threshold voltage for the transistor, and
    Vi/o_max is a maximum voltage for the I/O port.

18. The portable electronic device of claim 12 wherein the output of the regulator circuit is less than the power supply voltage on the power supply contact.

19. A method for operating an electronic device, comprising:
    transmitting or receiving data through a communications line that connects an I/O port to a communications contact of a bus connector, wherein the communications line is interrupted by a source terminal and a drain terminal of a transistor; and maintaining a gate voltage of the transistor, independent of voltage on a power supply contact of the connector, such that the transistor remains turned on while the data is being transmitted or received.

20. The method of claim 19 wherein the gate voltage is maintained at a level that is a) different than the voltage on the power supply contact, and b) constant despite changes to the voltage on the power supply contact.

21. The method of claim 20 wherein the gate voltage is maintained at said level while the electronic device is powered on and awake and while the electronic device is asleep.

22. The method of claim 19 wherein the gate voltage is maintained between a) Vi/o_limit+Vth and b) Vi/o_max+Vth where:

Vi/o_limit is a voltage swing limit for the I/O port,
Vth is a gate to source threshold voltage for the transistor, and
Vi/o_max is a maximum voltage for the I/O port.

* * * * *